(12) United States Patent
Kim

(10) Patent No.: US 9,188,769 B2
(45) Date of Patent: Nov. 17, 2015

(54) ZOOM LENS AND PHOTOGRAPHING APPARATUS HAVING THE SAME

(71) Applicant: SAMSUNG ELECTRONICS CO., LTD., Suwon-si, Gyeonggi-do (KR)

(72) Inventor: Yong-wook Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 163 days.

(21) Appl. No.: 13/937,467

(22) Filed: Jul. 9, 2013

(65) Prior Publication Data

US 2014/0176778 A1 Jun. 26, 2014

(30) Foreign Application Priority Data

Dec. 21, 2012 (KR) ........................ 10-2012-0150930

(51) Int. Cl.
| | |
|---|---|
| *G02B 15/14* | (2006.01) |
| *G02B 15/15* | (2006.01) |
| *G02B 13/00* | (2006.01) |
| *G02B 15/173* | (2006.01) |

(52) U.S. Cl.
CPC .............. *G02B 15/15* (2013.01); *G02B 13/009* (2013.01); *G02B 15/173* (2013.01)

(58) Field of Classification Search
CPC .... G02B 15/173; G02B 13/009; G02B 15/00; G02B 15/14; G02B 15/16
USPC ......... 359/676, 657, 658, 681, 682, 708, 713, 359/756; 396/72–88; 348/240.99–240.3
See application file for complete search history.

(56) References Cited

U.S. PATENT DOCUMENTS

| | | | |
|---|---|---|---|
| 7,286,300 B2 * | 10/2007 | Kuroda et al. | ................. 359/693 |
| 2002/0063970 A1 * | 5/2002 | Uzawa et al. | ................. 359/689 |

* cited by examiner

*Primary Examiner* — Darryl J Collins
*Assistant Examiner* — Journey Sumlar
(74) *Attorney, Agent, or Firm* — Drinker Biddle & Reath LLP

(57) ABSTRACT

A zoom lens and a photographing apparatus having the zoom lens are provided. The zoom lens includes: a first lens group having a positive refractive power; a second lens group having a negative refractive power; a third lens group including a shutter and having a positive refractive power; a fourth lens group having a positive refractive power, a fifth lens group having a negative refractive power, and a sixth lens group having a positive refractive power, wherein the first, second, third, fourth, fifth, and sixth are arranged from an object side toward an image side, and when the zoom lens zooms from a wide angle position to a telephoto position, the third lens group is fixed, and the first, second, fourth, fifth, and sixth lens groups are moved.

20 Claims, 14 Drawing Sheets

ZOOM LENS AND PHOTOGRAPHING APPARATUS HAVING THE SAME

CROSS-REFERENCE TO RELATED PATENT APPLICATION

This application claims the priority benefit of Korean Patent Application No. 10-2012-0150930, filed on Dec. 21, 2012, in the Korean Intellectual Property Office, the disclosure of which is incorporated herein in its entirety by reference.

BACKGROUND

1. Field

Various embodiments of the invention relate to a zoom lens having a small size and a high zoom magnification and a photographing apparatus having the same.

2. Related Art

Users demand high resolution and high magnification for a photographing apparatus using a solid-state imaging device, such as a digital camera, an interchangeable lens system, a video camera, or the like. Also, since the expertise of a consumer of the photographing apparatus has improved, a zoom lens of a digital camera or a digital camcorder connected to the photographing apparatus (e.g., a charge-coupled device (CCD) or a complementary metal oxide semiconductor (CMOS)) must have an optical system having a small size and a high magnification.

In order to create a zoom lens having the small size and the high magnification, a refractive power of each of lens groups of the zoom lens is increased, and the number of lenses is minimized. However, aberration change due to zooming of the zoom lens as described above increases, and it is difficult to obtain a high optical performance of the zoom lens in the entire zooming range. Also, a movement amount of a magnifying lens group is increased to allow the zoom lens to have a high zoom magnification. In this case, the entire length of the zoom lens becomes longer, and thus it is difficult to make the zoom lens small. Therefore, it is difficult to make the zoom lens small with high performance and high zoom magnification.

SUMMARY

Various embodiments provide a zoom lens having a small size and a high zoom magnification.

Various embodiments also provide a photographing apparatus having the zoom lens.

According to an embodiment, a zoom lens includes: a first lens group which has a positive refractive power; a second lens group which has a negative refractive power; a third lens group which includes a shutter and has a positive refractive power; a fourth lens group which has a positive refractive power; a fifth lens group which has a negative refractive power; and a sixth lens group which has a positive refractive power, wherein the first, second, third, fourth, fifth, and sixth lens groups are arranged from an object side toward an image side, and when the zoom lens zooms from a wide angle position to a telephoto position, the third lens group is fixed, and the first, second, fourth, fifth, and sixth lens groups are moved.

When the zoom lens zooms from the wide angle position to the telephoto position, a space between the first and second lens groups may be increased, a space between the second and third lens groups may be decreased, a space between the third and fourth lens groups may be decreased, a space between the fourth and fifth lens groups may be increased, and a space between the fifth and sixth lens groups may be varied.

The zoom lens may satisfy Equation below:

$$0.5 < |f2|/fw < 2.4$$

wherein f2 denotes a focal length of the second lens group, fw denotes a focal length of the zoom lens in the wide angle position.

The zoom lens may satisfy Equations below:

$$-4.5 < M5/fw < -3.0$$

$$0.01 < (D45t - D45w)/fw < 1.2$$

wherein M5 denotes a movement amount of the fifth lens group when the zoom lens zooms from the wide angle position to the telephoto position, D45w denotes a space between the fourth and fifth lens groups in the wide angle position, D45t denotes a space between the fourth and fifth lens groups in the telephoto position, and fw denotes a focal length of the zoom lens in the wide angle position.

The zoom lens may satisfy Equation below:

$$4.0 < f1/fw < 19.0$$

wherein f1 denotes a focal length of the first lens group, and fw denotes the focal length of the zoom lens in the wide angle position.

The zoom lens may satisfy Equation below:

$$30 < f3/fw < 42$$

wherein f3 denotes a focal length of the third lens group, and fw denotes the focal length of the zoom lens in the wide angle position.

The zoom lens may satisfy Equation below:

$$1.0 < f4/fw < 4.3$$

wherein f4 denotes a focal length of the fourth lens group, and fw denotes the focal length of the zoom lens in the wide angle position.

The zoom lens may satisfy Equation below:

$$2.0 < |f5|/fw < 10.1$$

wherein f5 denotes a focal length of the fifth lens group, and fw denotes the focal length of the zoom lens in the wide angle position.

The zoom lens may satisfy Equation below:

$$3.0 < f6/fw < 9.7$$

wherein f6 denotes a focal length of the sixth lens group, and fw denotes the focal length of the zoom lens in the wide angle position.

The fifth lens group may include one negative lens.

The zoom lens may satisfy Equation below:

$$-0.7 < (R5a + R5b)/(R5a - R5b) < 0.5$$

wherein R5a and R5b respectively denote a radius of curvature of the object side of the negative lens of the fifth lens group and a radius of curvature of the image side of the negative lens.

The zoom lens may satisfy Equation below:

$$65 < v5$$

wherein v5 denotes an Abbe's number of the negative lens of the fifth lens group.

The zoom lens may satisfy Equation below:

$$1.5 < (D56t - D56w)/fw < 4.3$$

wherein D56w and D56t respectively denote a space between the fifth and sixth lens groups in the wide angle position and a space between the fifth and sixth lens groups in the telephoto position.

The first lens group may include a first positive lens, a second positive lens, and a third positive lens having a meniscus shape whose object side surface is convex.

The first and second positive lenses may be cemented together.

The first lens group may include a first positive lens, a second positive lens, a third positive lens having a meniscus shape whose object side surface is convex, and a fourth positive lens having a meniscus shape whose object side surface is convex.

The second lens group may include a negative lens whose object side surface is convex and whose image side surface is concave, a negative lens whose surfaces on both sides are concave, and a positive lens whose object side surface is convex and whose image side surface is concave.

The second lens group may include a negative lens whose object side surface is convex and whose image side surface is concave, a negative lens whose surfaces on both sides are concave, a positive lens whose object side surface is convex and whose image side surface is concave, and a negative lens whose object side surface is convex and whose image side surface is concave.

The fourth lens group may compensate for hand-shaking.

The sixth lens group may perform focusing.

According to another embodiment, a photographing apparatus includes: a zoom lens and an imaging device. The zoom lens may include a first lens group having a positive refractive power, a second lens group having a negative refractive power, a third lens group including a shutter and having a positive refractive power, a fourth lens group having a positive refractive power, a fifth lens group having a negative refractive power, and a sixth lens group having a positive refractive power. The first, second, third, fourth, fifth, and sixth lens groups may be arranged from an object side toward the image side. When the zoom lens zooms from a wide angle position to a telephoto position, the third lens group may be fixed, and the first, second, fourth, fifth, and sixth lens groups may be moved.

BRIEF DESCRIPTION OF THE DRAWINGS

The above and other features and advantages will become more apparent by describing in detail exemplary embodiments thereof with reference to the attached drawings in which.

DETAILED DESCRIPTION

A zoom lens and a photographing apparatus having the zoom lens according to exemplary embodiments will now be described with reference to the attached drawings.

Figure 1:
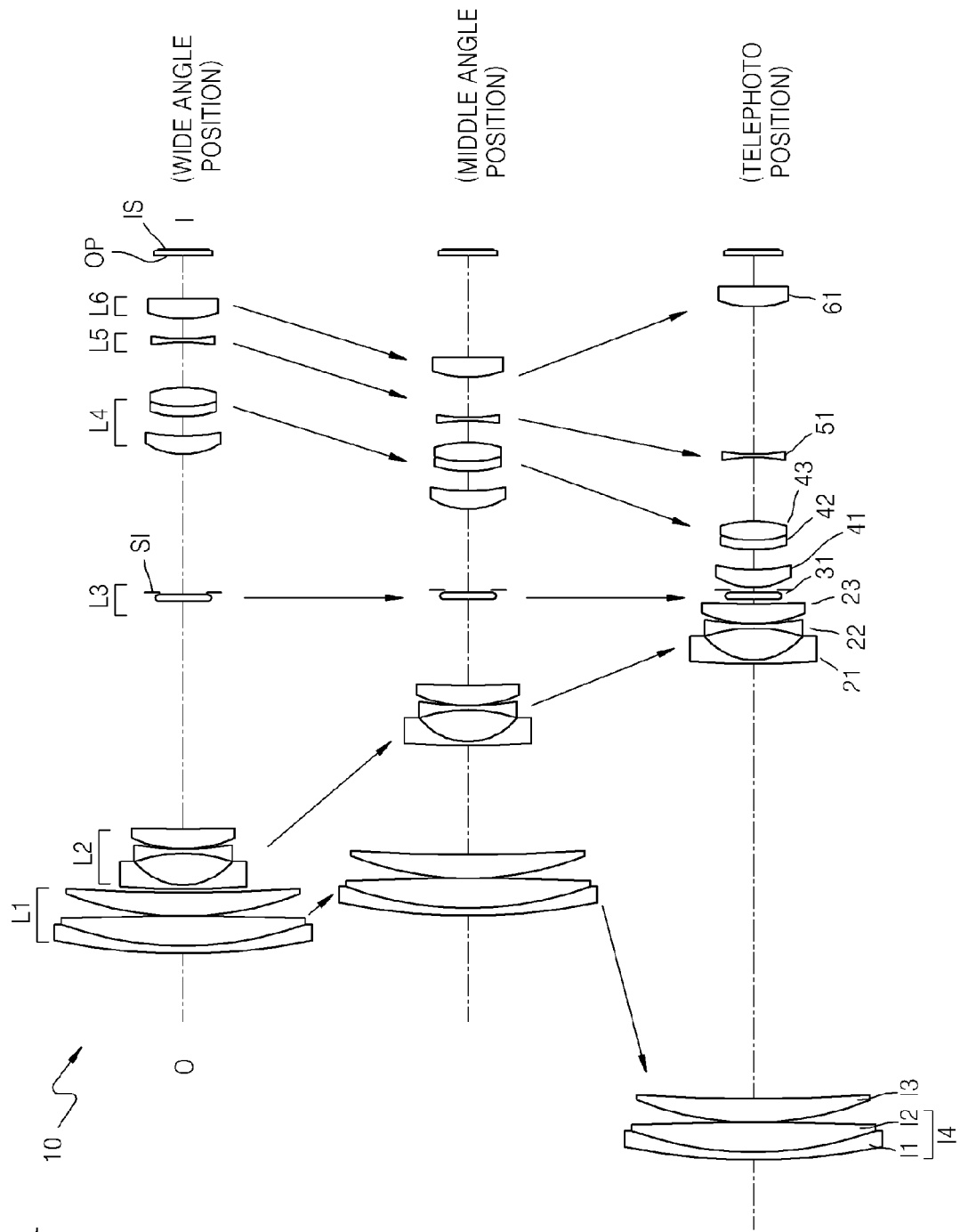
FIG. 1 is a diagram illustrating a zoom lens in a wide angle position, a middle position, and a telephoto position, according to an exemplary embodiment.

FIG. 1 is a diagram illustrating a zoom lens 10, according to an exemplary embodiment.

The zoom lens 10 includes a first lens group L1 having a positive refractive power, a second lens group L2 having a negative refractive power, a third lens group L3 having a positive refractive power, a fourth lens group L4 having a positive refractive power, a fifth lens group L5 having a negative refractive power, and a sixth lens group L6 having a positive refractive power. Here, the first, second, third, fourth, fifth, and sixth lens groups L1, L2, L3, L4, L5, and L6 are arranged from an object side O toward an image side I. The third lens group L3 may include a shutter SI. When the zoom lens 10 zooms from a wide angle position to a telephoto position, the third lens group L3 is fixed, and the first, second, fourth, fifth, and sixth lens groups L1, L2, L4, L5, and L6 move.

For example, when the zoom lens 10 zooms from the wide angle position to the telephoto position, a space between the first and second lens groups L1 and L2 may increase, a space between the second and third lens groups L2 and L3 may decrease, a space between the third and fourth lens groups L3 and L4 may decrease, a space between the fourth and fifth lens groups L4 and L5 may increase, and a space between the fifth and sixth lens groups L5 and L6 may vary.

The shutter iris SI defines F number Fno and simultaneously adjusts a shutter speed to adjust an amount of light. A filter OP is installed toward the image side I of the zoom lens 10. The filter OP may be a low pass filter (LPF). For example, the filter OP may block light of various colors except a red color. An imaging device IS may be installed to form an image using light that has passed through the zoom lens 10. The imaging device IS may be a charge-coupled device (CCD) or a complementary metal oxide semiconductor (CMOS). The imaging device IS operates as a film of a photographing optical system. A zoom lens according to an exemplary embodiment may reduce the length of the zoom lens and may have a high zoom magnification in the wide angle position and the telephoto position.

The fourth lens group L4 may be moved in a direction perpendicular to an optical axis to compensate for image-shaking that occurs when the zoom lens 10 vibrates. In other words, the fourth lens group L4 may perform a hand-shaking compensation. The sixth lens group L6 may perform focusing.

The zoom lens 10 according to the present exemplary embodiment may satisfy Equation 1 below:

$$0.5 < |f2|/fw < 2.4 \quad (1)$$

wherein f2 denotes a focal length of the second lens group L2, and fw denotes a focal length of the zoom lens 10 at the wide angle position.

Equation 1 above defines the focal length of the second lens group L2, i.e., a refractive power. If (|f2|/fw) exceeds the upper limit of Equation 1, the refractive power of the second lens group L2 becomes too weak, and a magnifying operation of the second lens group L2 becomes weaker. Therefore, it is difficult to move a lens group by a small amount and achieve a high zoom magnification. If the space between the first and second lens groups L1 and L2 is increased when the zoom lens 10 zooms from the wide angle position to the telephoto position to achieve the high zoom magnification, the full length of the zoom lens 10 is increased, and it is difficult to make the zoom lens 10 small. If (|f2|/fw) exceeds the lower limit, the refractive power of the second lens group L2 becomes too strong. Therefore, a field curvature of the second lens group L2 may occur in the wide angle position, and a spherical aberration of the second lens group L2 may occur in the telephoto position.

The zoom lens 10 according to the present exemplary embodiment may satisfy Equations 2 and 3 below:

$$-4.5 < M5/fw < -3.0 \quad (2)$$

$$0.01 < (D45t - D45w)/fw < 1.2 \quad (3)$$

wherein M5 denotes a movement amount of the fifth lens group L5 when zooming from the wide angle position to the telephoto position, 45w denotes a space between the fourth and fifth lens groups L4 and L5 in the wide angle position, and D45t denotes a space between the fourth and fifth lens groups L4 and L5 in the telephoto position.

Equation 2 above defines the movement amount of the fifth lens group L5. If (M5/fw) exceeds the upper limit, a movement amount of the fifth lens group L5 toward the object side O is too small. Therefore, a magnifying operation becomes weaker, and it is difficult to achieve a high zoom magnification. Here, if the refractive power of the first lens group L1 is made stronger to compensate for the magnifying operation, a spherical aberration may occur in the telephoto position. If the refractive power of the second lens group L2 is made stronger to compensate for the magnifying operation, a field curvature may occur in the wide angle position, and a spherical aberration may occur in the telephoto position. If (M5/fw) exceeds the lower limit, and a movement amount of the fifth lens group L5 toward the object side O is too great, a full length of the entire optical system becomes longer.

Therefore, it is difficult to make the full length of the zoom lens 10 short.

Equation 3 defines a variation in the space between the fourth and fifth lens groups L4 and L5 when zooming from the wide angle position to the telephoto position. If ((D45t−D45w)/fw) exceeds the upper limit, and thus the variation in the space between the fourth and fifth lens groups L4 and L5 is too great, a fluctuation in a magnification chromatic aberration may increase due to zooming. Also, if ((D45t−D45w)/fw) exceeds the lower limit, and thus the variation between the space between the fourth and fifth lens groups 4 and 5 is too small, the magnifying operation becomes weaker. If a variation in the space between the first and second lens groups L1 and L2 is large when zooming from the wide angle position to the telephoto position to achieve a high magnification, the full length of the zoom lens 10 in the telephoto position is increased and thus it is difficult to make the zoom lens 10 short.

The zoom lens 10 according to the present exemplary embodiment has a small effective size in a front part thereof, a short full length, a high zoom magnification and a well compensated aberration over an entire area when zooming, thereby achieving a high optical performance.

The zoom lens 10 may satisfy Equation 4 below:

$$4.0 < f1/fw < 19.0 \quad (4)$$

wherein f1 denotes a focal length of the first lens group L1, and fw denotes a focal length of the zoom lens at the wide angle position.

Equation 4 defines the focal length of the first lens group L1, i.e., the refractive power. If (f1/fw) exceeds the upper limit, and the refractive power is too weak, a magnifying operation of the second lens group L2 becomes weaker. If a movement amount of the first lens group L1 is increased when zooming to compensate for the magnifying operation, a full length of the zoom lens 10 in the telephoto position is increased. Therefore, it is difficult to make the zoom lens 10 small.

In this case, if the refractive powers of the third and fourth lens groups L3 and L4 instead of the first lens group L1 are reinforced to compensate for the magnifying operation, many aberrations, such as a spherical aberration, a comma aberration, axial chromatic aberration, etc., may occur. If the number of lenses is added to compensate for an aberration, it is difficult to make the zoom lens 10 small. If (f1/fw) exceeds the lower limit of Equation 4, the refractive power of the first lens group L1 is too strong, and thus many spherical aberrations may occur.

The zoom lens 10 according to the present exemplary embodiment may satisfy Equation 5 below:

$$30 < f3/fw < 42 \quad (5)$$

wherein f3 denotes a focal length of the third lens group L3, and fw denotes a focal length of the zoom lens at the wide angle position.

Equation 5 defines the refractive power of the third lens group L3. If (f3/fw) exceeds the upper limit of Equation 5, the refractive power of the third lens group L3 becomes weaker. Therefore, a magnifying operation of the third lens group L3 becomes weaker, and a high magnification of the third lens group L3 is difficult to obtain. If (3/fw) exceeds the lower limit of Equation 5, the refractive power of the third lens group L3 is too strong, and thus a spherical aberration may occur due to the third lens group L3.

The zoom lens 10 may satisfy Equation 6 below:

$$1.0 < f4/fw < 4.3 \quad (6)$$

wherein f4 denotes a focal length of the fourth lens group L4, and fw denotes the focal length of the zoom lens at the wide angle position.

Equation 6 defines the focal length of the fourth lens group L4, i.e., the refractive power. If (f4/fw) exceeds the upper limit of Equation 6, the refractive power of the fourth lens group L4 is weak. Therefore, a magnifying operation of the fourth lens group L4 becomes weaker, and it is difficult to obtain a high magnification of the fourth lens group L4. If a movement amount of the fourth lens group L4 is increased when zooming to compensate for the zoom magnification, the full length of the zoom lens 10 in the telephoto position is increased. Therefore, it is difficult to make the zoom lens 10 small. If (f4/fw) exceeds the lower limit of Equation 6, the refractive power of the fourth lens group L4 becomes too strong. Therefore, a spherical aberration, a coma aberration, an axial chromatic aberration, etc. may occur due to the fourth lens group L4 when zooming.

The zoom lens may satisfy Equation 7 below:

$$2.0 < |f5|/fw < 10.1 \quad (7)$$

wherein f5 denotes a focal length of the fifth lens group L5, and fw denotes the focal length of the zoom lens at the wide angle position.

Equation 7 defines the refractive power of the fifth lens group L5. If |f5|/fw exceeds the upper limit of Equation 7, the refractive power of the fifth lens group L5 is weak. Therefore, a magnifying operation of the fifth lens group L5 becomes weaker, and it is difficult to obtain a high magnification of the fifth lens group L5. If movement amounts of the fourth and fifth lens groups L4 and L5 are increased when zooming to compensate for the zoom magnification, the full length of the zoom lens 10 in the telephoto position is increased. Therefore, it is difficult to make the zoom lens 10 small. If |f5|/fw exceeds the lower limit of Equation 7, the refractive power of the fifth lens group L5 is too strong. Therefore, a spherical aberration, an axial chromatic aberration, etc. may occur when zooming. Here, if the number of lenses is added to compensate for an aberration, it is difficult to make the entire zoom lens 10 small due to an increase in a sum of thicknesses of the lenses.

The zoom lens 10 may satisfy Equation 8 below:

$$3.0 < f6/fw < 9.7 \quad (8)$$

wherein f6 denotes a focal length of the sixth lens group L6, and fw denotes the focal length of the zoom lens at the wide angle position.

Equation 8 defines the focal length of the sixth lens group L6, i.e., the refractive power of the sixth lens group L6. If f6/fw exceeds the upper limit of Equation 8, the refractive power of the sixth lens group L6 becomes weaker, an effect for compensating for a variation in a focal point when focusing the sixth lens group L6 is reduced, and a movement amount for focusing is increased. If the movement amount for focusing is increased, it is difficult to achieve fast focusing.

If f6/fw exceeds the lower limit of Equation 8, the refractive power of the sixth lens group L6 becomes too strong. Therefore, a sum of petzvals is increased, and a field curvature is increased when zooming. If the number of lenses is added to compensate for the field curvature, a weight of the lenses is increased, and thus a size of a driving source for driving the sixth lens group L6 is increased. Therefore, it is difficult to perform fast focusing due to the sixth lens group L6.

The fifth lens group L5 may include one negative lens 51, and the negative lens 51 may satisfy Equation 9:

$$-0.7 < (R5a+R5b)/(R5a-R5b) < 0.5 \quad (9)$$

wherein R5a and R5b respectively denote a radius of curvature of an object side surface of the negative lens 51 of the fifth lens group L5 and a radius of curvature of an image side surface of the negative lens 51.

Equation 9 defines a shape of the negative lens 51 of the fifth lens group L5. If (R5a+R5b)/(R5a-R5b) is greater than 0, the image side surface of the negative lens 51 has a shape concave toward the image side I. If (R5a+R5b)/(R5a-R5b) exceeds the upper limit of Equation 9, a curvature of the image side surface is more reduced, and thus many anastigmatic aberrations may occur with respect to a non-axial light speed in the entire range of zooming.

If (R5a+R5b)/(R5a-R5b) is smaller than 0, the object side surface of the negative lens 51 positioned toward the object side O is concave toward the object side O. If (R5a+R5b)/(R5a-R5b) exceeds the lower limit of Equation 9, the curvature of the object side surface of the negative lens 51 positioned toward the object side O may be more reduced, and a spherical aberration, an axial chromatic aberration, etc. may occur in the entire range of zooming.

The negative lens 51 of the fifth lens group L5 may satisfy Equation 10:

$$65 < v5 \quad (10)$$

wherein v5 denotes an Abbe's number of the negative lens 51 of the fifth lens group L5.

Equation 10 defines the Abbe's number of a material of the negative lens 51 of the fifth lens group L5. If v5 exceeds the lower limit of Equation 5, many magnification chromatic aberrations may occur due to the fifth lens group L5. It may be difficult to reduce a magnification chromatic aberration in an entire zooming range in a zoom lens having a high magnification.

The fifth and sixth lens groups L5 and L6 may satisfy Equation 11.

$$1.5 < (D56t - D56w)/fw < 4.3 \quad (11)$$

wherein D56w and D56t respectively denote the space between the fifth and sixth lens groups L5 and L6 in the wide angle position and the telephoto position.

Equation 11 defines a variation in the space between the fifth and sixth lens groups L5 and L6 when zooming. If (D56t−Dw)/fw exceeds the upper limit of Equation 11, the variation in the space between the fifth and sixth lens groups L5 and L6 is great, and thus the sixth lens group L6 is positioned relatively close to the image side at the telephoto position. In this case, a lateral magnification of the sixth lens group L6 is increased, and thus an effect of compensating for a focal point when performing focusing by the sixth lens group L6 may become weaker. When performing focusing by the sixth lens group L6, a movement amount of focusing may be increased, and thus fast focusing may become difficult. If (Dt−D56w)/fw exceeds the lower limit of Equation 11, the variation in the space between the fifth and sixth lens groups L5 and L6 is too small, and thus the sixth lens group L6 may be positioned relatively close to the object side O in the telephoto position. In this case, when the zoom lens 10 zooms from the wide angle position to the telephoto position, a movement stroke length of the sixth lens group L6 becomes longer, and thus a driver for driving the sixth lens group L6 may become larger.

An aspherical surface used in the zoom lens 10 is defined as follows.

When an axis direction is an x axis, a direction perpendicular to the axis direction is an y axis, a travelling direction of a light beam is set to be positive in order to express the aspherical surface as in Equation 12 below. Here, x denotes a distance from a peak of a lens to the axis direction, y denotes a distance to a direction perpendicular to the axis direction, K denotes a conic constant, A, B, C, and D denote aspherical coefficients, and c denotes an inverse number 1/R of a curvature radius at the peak of the lens.

$$x = \frac{cy^2}{1 + \sqrt{1 - (K+1)c^2 y^2}} + Ay^4 + By^6 + Cy^8 + Dy^{10} \quad (12)$$

Design data of the zoom lens 10 will now be described. f denotes a focal length in mm, Fno denotes F number, 2ω denotes a view angle and uses the unit of degree, R denotes a radius of curvature, Dn denotes a distance between lenses or a thickness of a lens, Nd denotes a refractive index, Vd denotes the Abbe's number, SI denotes a shutter, OBJ denotes an object surface, and ASP denotes an ashperical surface. At least one filter OP may be installed the closest to the image side I in the drawings illustrating exemplary embodiments.

FIG. 1 illustrates the wide angle position, the middle position, and the telephoto position of the zoom lens 10, according to an exemplary embodiment. Design data of the present exemplary embodiment will now be described. Reference characters S1, S2, . . . , and Sn of lens surfaces are sequentially marked from a first surface of a lens closest to the object side O and will be omitted in FIG. 1.

A zoom magnification of the zoom lens 10 according to the present exemplary embodiment is 37.79, and F number Fno of the zoom lens 10 is between 2.84 and 6.54. FIGS. 2 through 7 illustrate aberrations, field curvatures, and distortions of the zoom lens 10 in the wide angle position, the middle position, and the telephoto position.

The zoom lens 10 includes the first lens group L1 having a positive refractive power, the second lens group L2 having a negative refractive power, the third lens group L3 having a positive refractive power, the fourth lens group L4 having a positive refractive power, the fifth lens group L5 having a negative refractive power, and the sixth lens group L6 having a positive refractive power.

The first lens group L1 includes a cemented lens 14 in which first and second positive lenses 11 and 12 are cemented, and a third positive lens 13 having a meniscus shape which is convex toward the object side O. The refractive power of the first lens group L1 may be reinforced to make the zoom lens 10 of the present exemplary embodiment small and obtain a high zoom magnification. Here, many aberration occurring in the first lens group L1, particularly, many spherical aberration, may occur in the telephoto position. In the present exemplary embodiment, as described above, the first lens group L1 may be installed to reduce occurrences of aberrations. Also, the second positive lens 12 may be formed of a low dispersion material (e.g., ED glass) having Abbe's number more than 80. Therefore, an axial chromatic aberration and a magnification chromatic aberration may be favorably compensated in the telephoto position.

A side of the second lens group L2 includes a negative lens 21 whose object side surface is convex and whose image side surface is concave, a negative lens 22 having both concave sides, and a positive lens 23 whose object side surface is convex and whose image side surface is concave. A wide view angle may be objected in the wide angle position, and the refractive power of the second lens group L2 may be reinforced to make an effective aperture size of the first lens group L1 small. Here, an aberration may occur due to the second lens group L2. For example, a field curvature may occur in the wide angle position, and a spherical aberration may occur in the telephoto position. Here, occurrences in aberrations may be reduced due to the two negative lenses 21 and 22. Therefore, a wide angle may be achieved, and a small zoom lens having a front effective aperture size may be achieved. The positive lens 23 may be formed of a high dispersion material having Abbe's number smaller than 20 to minimize a refractive power of each lens of the second lens group L2. Therefore, the number of lenses may be reduced, and the zoom lens 10 may be made small.

The third lens group L3 includes a positive lens 31 whose object side surface is convex and whose image side surface is concave. The third lens group L3 may compensate for an aberration occurring due to the refractive power of the second lens group L2. For example, the positive lens 31 may be formed of a plastic aspherical lens to contribute to a reduction in weight of the zoom lens 10.

The fourth lens group L4 includes a positive lens 41 whose object side surface is convex, a negative lens 42 whose image side surface is concave, and a positive lens 43 whose object side surface is convex and whose image side surface is concave. The refractive power of the fourth lens L4 may be reinforced to reinforce a magnifying operation of the fourth lens group L4 and reduce the full length of the zoom lens 10 in the wide angle position. Here, many aberrations may occur in the fourth lens group L4, in particular, a spherical aberration, a coma aberration, and an axial chromatic aberration may occur over the entire zooming area when zooming. Here, the fourth lens group L4 may be divided into two positive lenses to form the positive refractive power of the fourth lens group L4 in order to reduce occurrences in the above-mentioned aberrations. Also, the negative lens 42 may be formed of a high dispersion material having an Abbe's number smaller than 26 to limit a refractive power of each lens of the fourth lens group L4. Therefore, the number of lenses may be reduced, and the zoom lens 10 may be made small.

The fifth lens group L5 includes the negative lens 51. The fifth lens group L5 may include one lens to make the zoom lens 10 small and light. The negative lens 51 may be formed of a low dispersion material having am Abbe's number more than 70 to reduce a variation in a chromatic aberration that occurs with the zoom magnification.

The sixth lens L6 includes a positive lens 61. The positive lens 61 may be formed of a material having Abbe's number more than 80 to reduce an occurrence in a magnification chromatic aberration over the entire zooming area when focusing the zoom lens 10.

TABLE 1

| Lens Surface | R | Dn | Nd | Vd | Remarks |
|---|---|---|---|---|---|
| S1 | 115.522 | 1.00 | 1.9036 | 31.31 | |
| S2 | 58.236 | 4.64 | 1.4969 | 81.60 | |
| S3 | −394.814 | 0.10 | | | |
| S4 | 53.361 | 3.41 | 1.6204 | 60.34 | |
| S5 | 237.048 | D1 | | | |
| S6 | 324.040 | 0.60 | 1.8348 | 42.72 | |
| S7 | 9.899 | 4.91 | | | |
| S8 | −33.249 | 0.60 | 1.8042 | 46.50 | |
| S9 | 44.246 | 0.10 | | | |
| S10 | 20.912 | 3.00 | 1.9590 | 17.46 | |
| S11 | 87.456 | D2 | | | |
| S12 | 54.408 | 0.75 | 1.5311 | 55.73 | Aspherical Surface |
| S13 | 118.932 | 0.5 | | | |
| S14 | Iris (IRIS) | D3 | | | |
| S15 | 11.067 | 2.80 | 1.5891 | 61.25 | Aspherical Surface |
| S16 | 32.706 | 3.26 | | | Aspherical Surface |
| S17 | 25.963 | 1.00 | 1.8051 | 25.45 | |
| S18 | 11.466 | 0.30 | | | |
| S19 | 16.577 | 3.00 | 1.4874 | 70.44 | |
| S20 | −17.982 | D4 | | | |
| S21 | −74.531 | 0.5 | 1.4874 | 70.44 | |
| S22 | 33.923 | D5 | | | |
| S23 | 19.0942 | 2.95 | 1.4969 | 81.60 | Aspherical surface |

TABLE 1-continued

| Lens Surface | R | Dn | Nd | Vd | Remarks |
|---|---|---|---|---|---|
| S24 | 222.010 | D6 | | | |
| S25 | ∞ | 0.6 | 1.5167 | 64.19 | |
| S26 | ∞ | 0.3 | | | |

Table 2 below shows a variable distance of the zoom lens 10 when magnifying zoom lens 10.

TABLE 2

| | D1 | D2 | D3 | D4 | D5 | D6 |
|---|---|---|---|---|---|---|
| Wide angle position (80.1 deg) | 0.7 | 35.49 | 21.43 | 6.97 | 3.39 | 6.82 |
| Middle position (37.4 deg) | 17.05 | 13.65 | 12.79 | 3.29 | 6.33 | 16.18 |
| Telephoto position (2.5 deg) | 67.97 | 1.00 | 0.50 | 9.86 | 22.96 | 5.23 |

Table 3 below shows aspherical coefficients in the present exemplary embodiment.

TABLE 3

S12 Aspherical Coefficient
K: 0
A: 0.456044E−12  B: 0.504960E−13  C: 0,  D: 0
S15 Aspherical Coefficient
K: 0
A: 0.479394E−05  B: 0.147111E−05  C: −.902288E−07  D: 0.161482E−08
S16 Aspherical Coefficient
K = 0
A: 0.113195E−03  B: 0.200799E−05  C: −.117425E−06  D: 0.219840E−08
S23 Aspherical Coefficient
K = 0
A: −.106026E−04  B: 0.503113E−06  C: −.156295E−07  D: 0.222500E−09

Table 4 below shows that the zoom lens 10 satisfies Equations 1 through 11.

TABLE 4

| | Equation | Present Exemplary Embodiment |
|---|---|---|
| Equation 1 | $0.5 < |f2|/fw < 2.4$ | 2.2759 |
| Equation 2 | $-4.5 < M5/fw < -3.0$ | −3.84471 |
| Equation 3 | $0.01 < (D45t - D45w)/fw < 1.0$ | 0.608 |
| Equation 4 | $4.0 < f1/fw < 19.0$ | 18.85 |
| Equation 5 | $30 < f3/fw < 42$ | 39.3569 |
| Equation 6 | $1.0 < f4/fw < 4.3$ | 4.27401 |
| Equation 7 | $2.0 < |f5|/fw < 10.1$ | 10.00 |
| Equation 8 | $3.0 < f6/fw < 9.7$ | 8.7646 |
| Equation 9 | $-0.7 < (R5a + R5b)/(R5a - R5b) < 0.5$ | 0.374431 |
| Equation 10 | $65 < v5$ | 70.44 |
| Equation 11 | $1.5 < (D56t - D56w)/fw < 4.3$ | 4.11313 |

Figure 2:
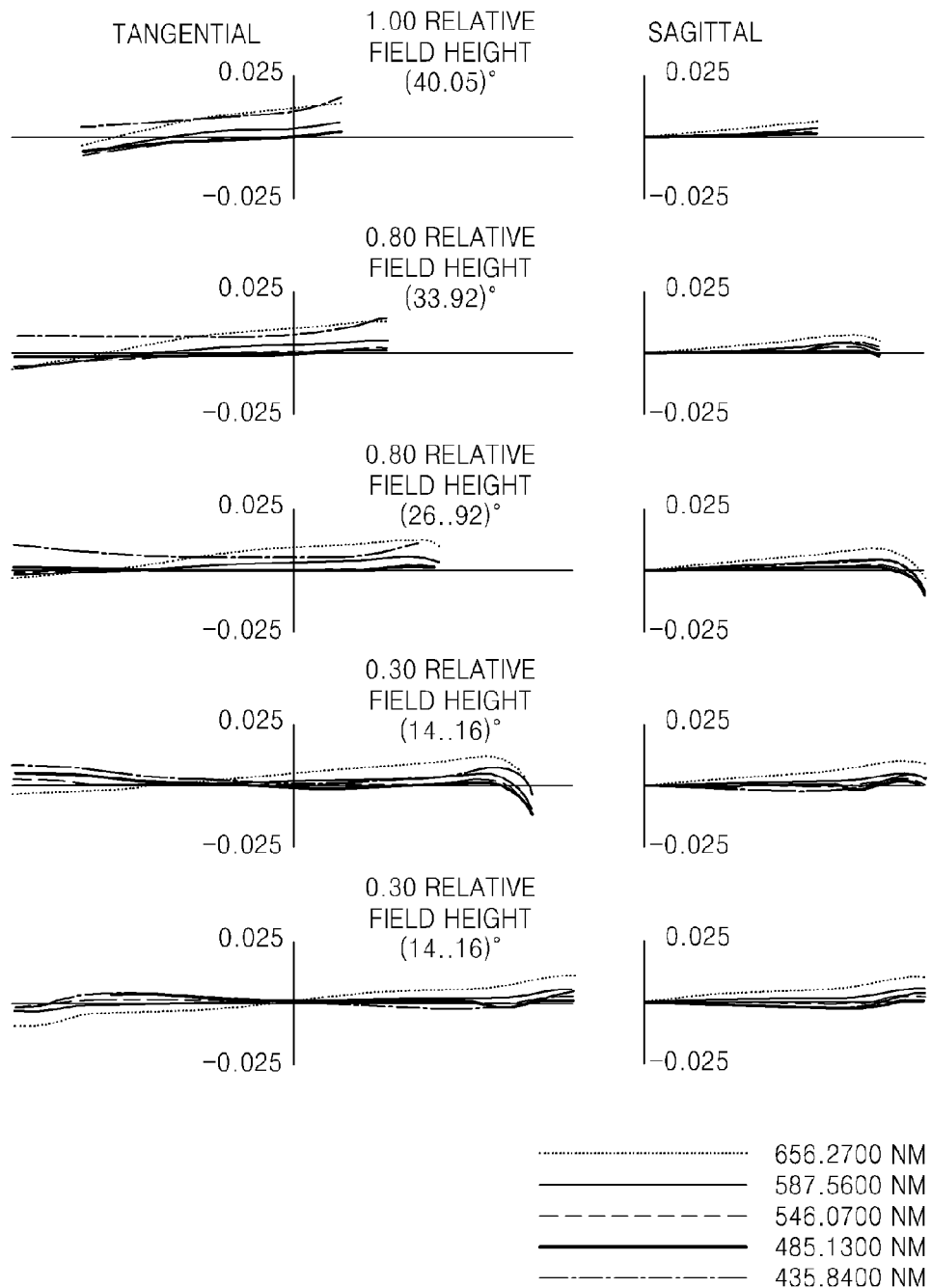
FIG. 2 is a diagram illustrating a lateral aberration of a zoom lens in a wide angle position, according to an exemplary embodiment.
Figure 3:
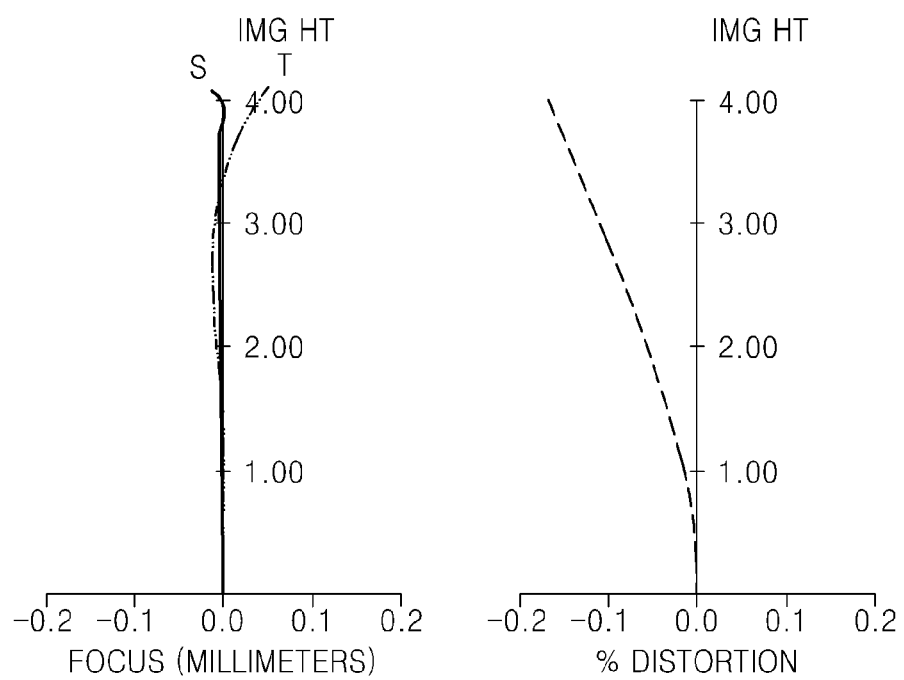
FIG. 3 is a diagram illustrating a field curvature and a distortion of a zoom lens in a wide angle position, according to an exemplary embodiment.
Figure 4:
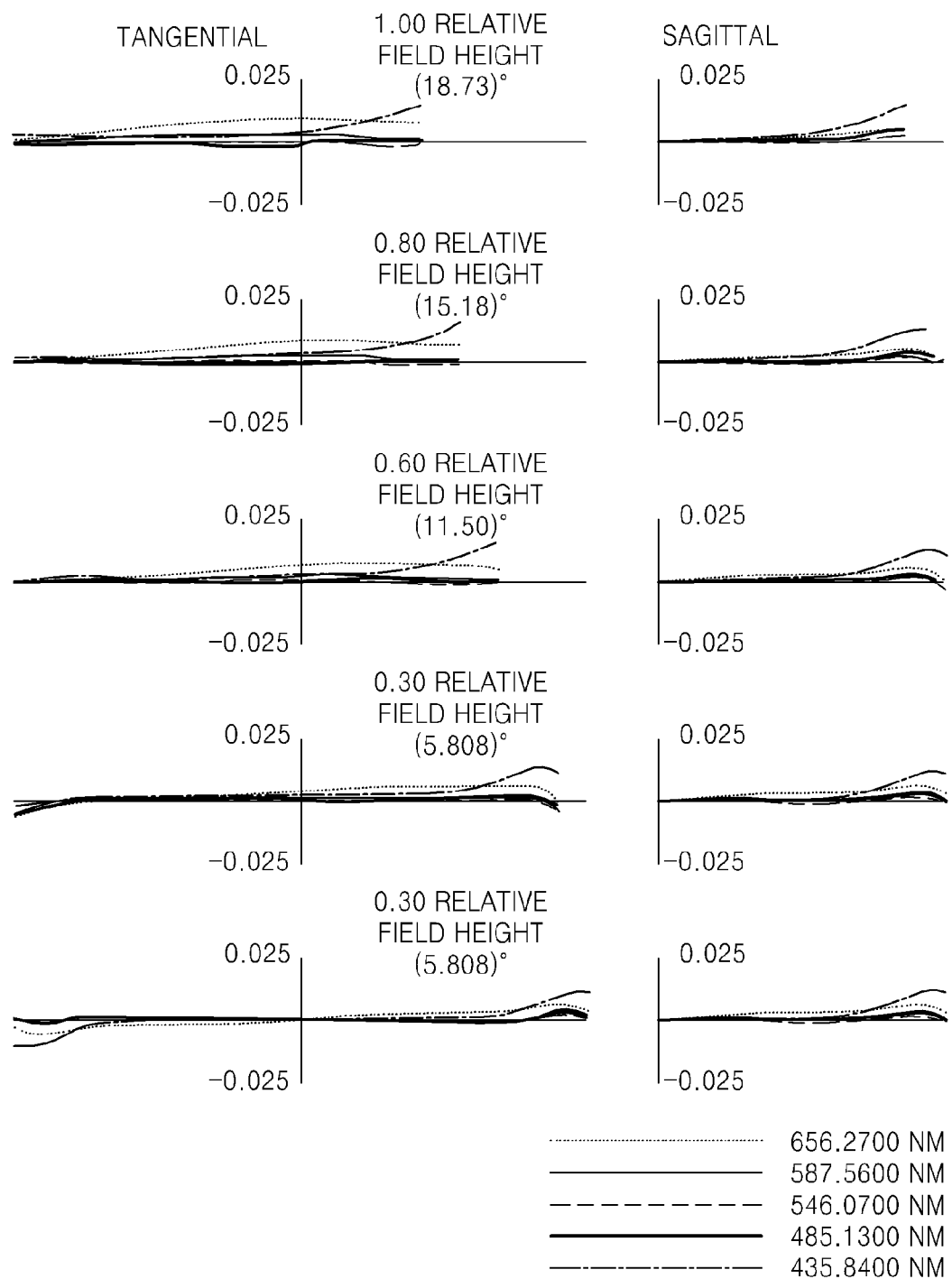
FIG. 4 is a diagram illustrating a lateral aberration of a zoom lens in a middle position, according to an exemplary embodiment.
Figure 5:
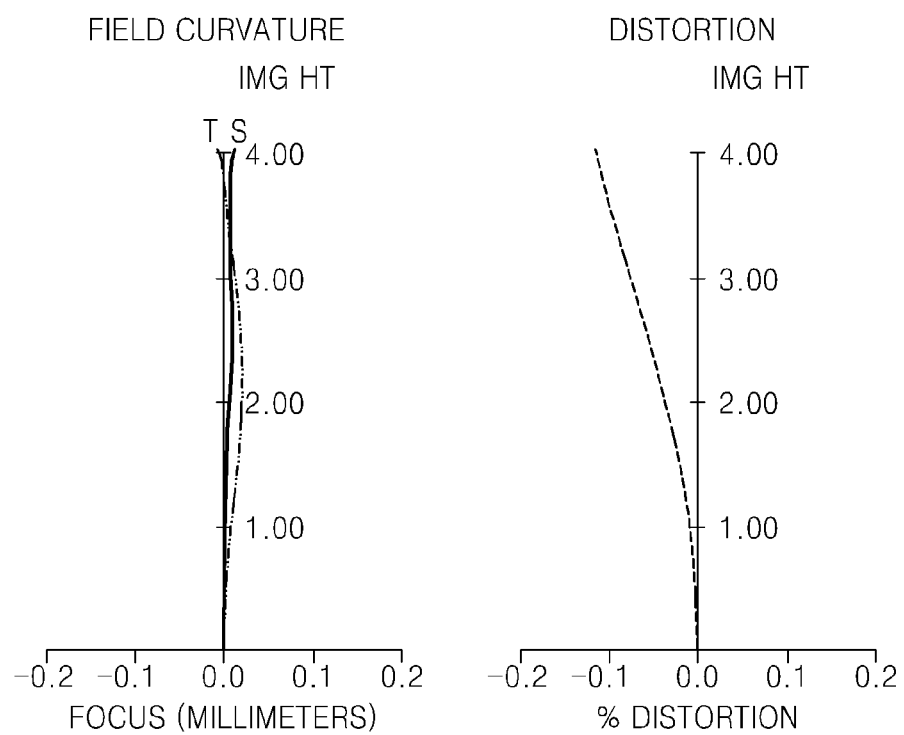
FIG. 5 is a diagram illustrating a field curvature and a distortion of a zoom lens in a middle position, according to an exemplary embodiment.
Figure 6:
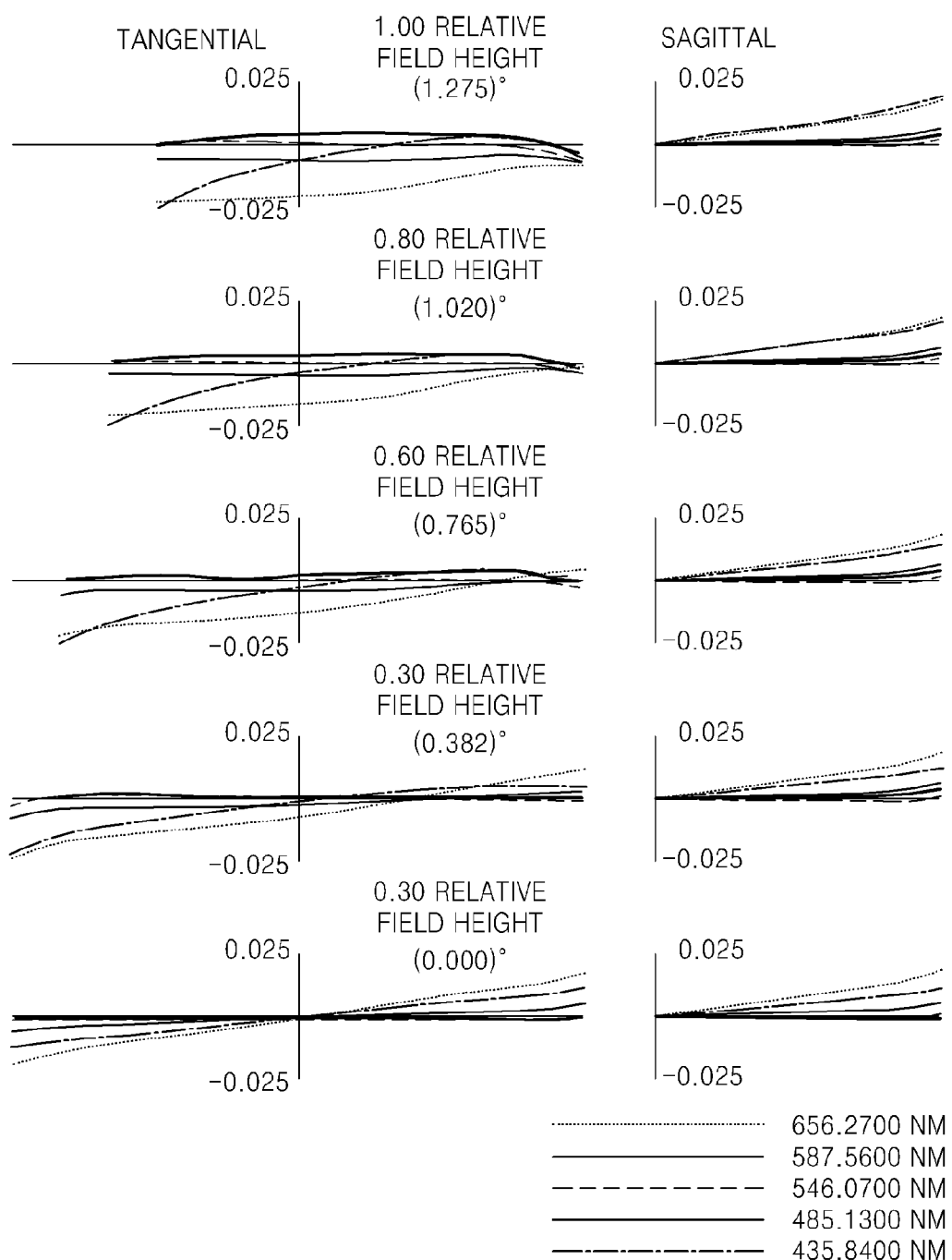
FIG. 6 is a diagram illustrating a lateral aberration of a zoom lens in a telephoto position, according to an exemplary embodiment.
Figure 7:
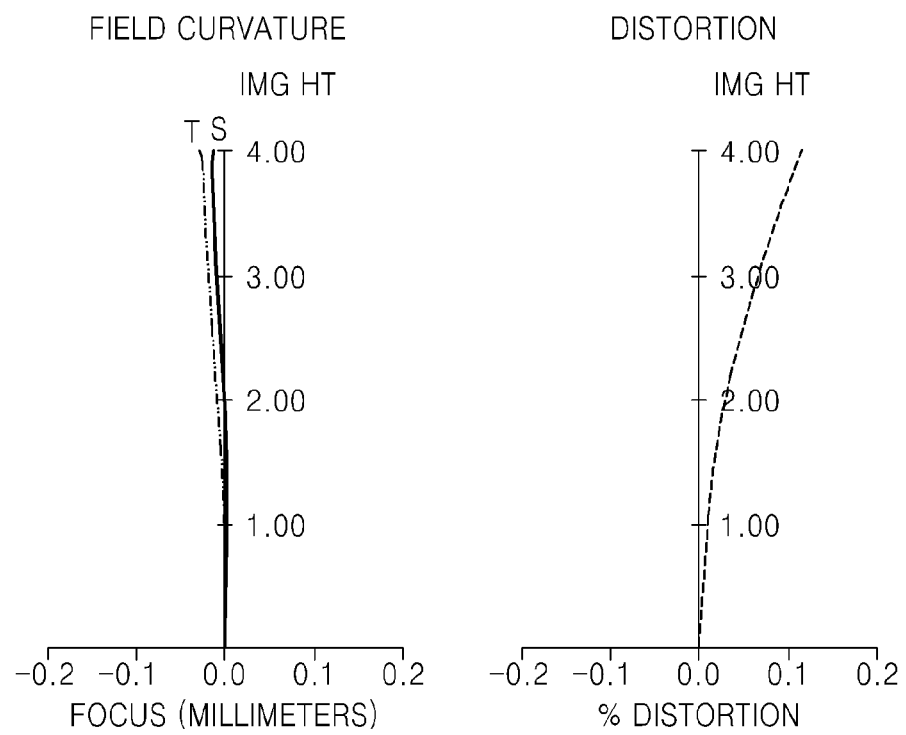
FIG. 7 is a diagram illustrating a field curvature and a distortion of a zoom lens in a telephoto position, according to an exemplary embodiment.

FIGS. 2, 4, and 6 respectively illustrate lateral aberrations in the wide angle position, the middle position, and the telephoto position of the zoom lens 10, i.e., illustrate a meridional fan and a sagittal fan in fields 0.0 (on axis), 0.3, 0.6, 0.8, and 1.0. FIGS. 3, 5, and 7 respectively illustrating field curvatures and distortions in the wide angle position, the middle position, and the telephoto position of the zoom lens 10. The field curvature includes a tangential field curvature T and a sagittal field curvature.

Figure 8:
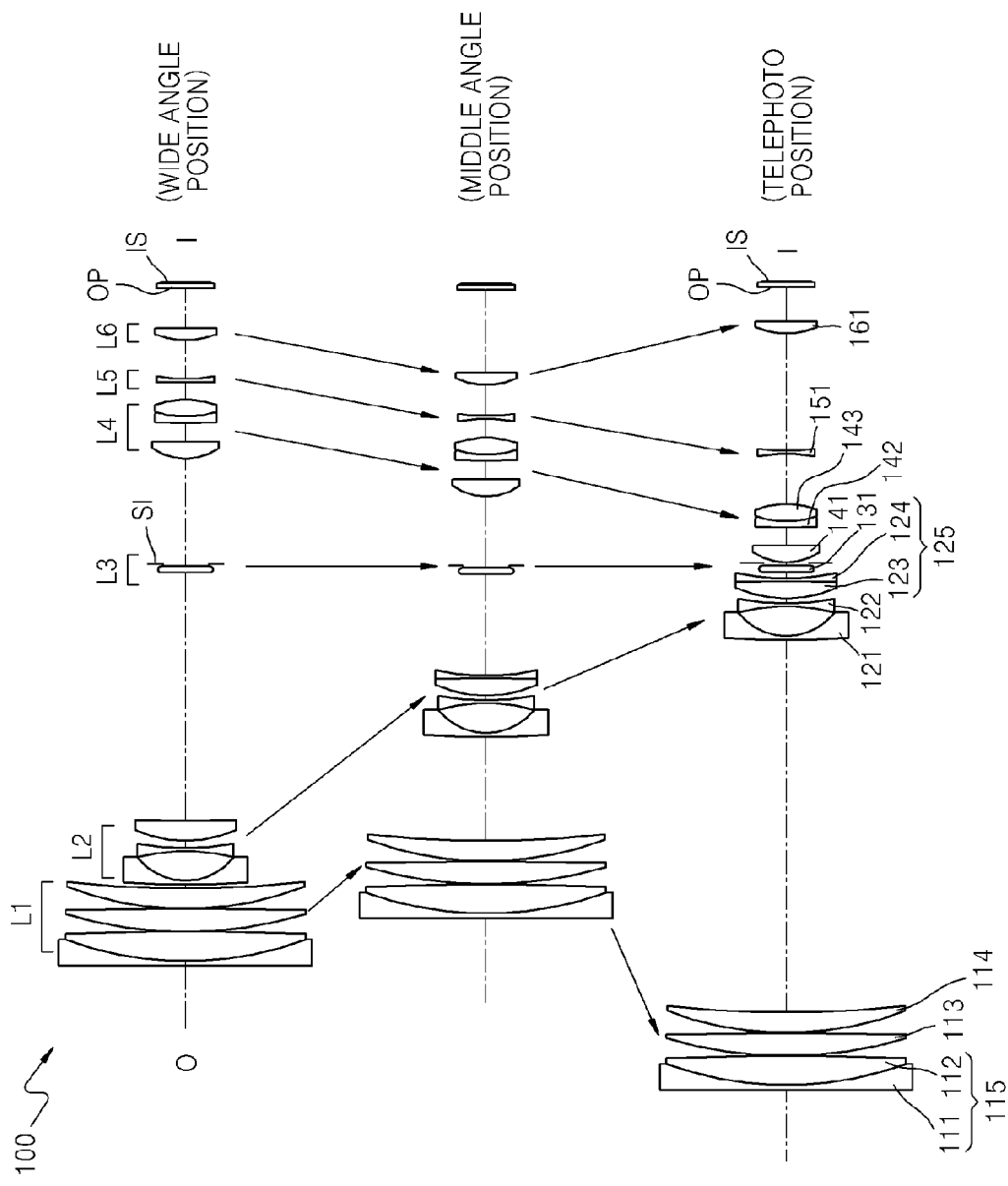
FIG. 8 is a diagram illustrating a zoom lens in a wide angle position, a middle position, and a telephoto position, according to another exemplary embodiment.

FIG. 8 illustrates a zoom lens 100 in a wide angle position, a middle position, and a telephoto position, according to another exemplary embodiment. Design data of the present exemplary embodiment will now be described.

A zoom magnification of the zoom lens 100 is about 37.67, and F number Fno of the zoom magnification of the zoom lens 100 is between 2.84 and 5.95.

The zoom lens 100 includes a first lens group L1 having a positive refractive power, a second lens group L2 having a negative refractive power, a third lens group L3 having a positive refractive power, a fourth lens group L4 having a positive refractive power, a fifth lens group L5 having a negative refractive power, and a sixth lens group L6 having a positive refractive power.

The first lens group L1 includes four positive lenses 111, 112, 113, and 114. The first lens group L1 includes a cemented lens 115 in which the positive lenses 111 and 112 are cemented. The positive lenses 113 and 114 may have meniscus shapes whose object side surfaces positioned toward an object side O are convex.

The positive lens 112 may be formed of a low dispersion material having Abbe's number more than 80, and thus an axial chromatic aberration and a magnification chromatic aberration in the telephoto position may be favorably compensated.

The second lens group L2 includes four lenses. The second lens group L2 includes a negative lens 121 whose object side surface positioned toward the object side O is convex and whose image side surface is concave, a negative lens 122 whose both side surfaces are concave, a positive lens 123 whose object side surface positioned toward the object side O is convex and whose image side surface is concave, and a negative lens 124 whose object side surface positioned toward the object side O is convex and whose image side surface is concave. The positive lens 123 and the negative lens 123 are cemented together to form the cemented lens 125. A chromatic aberration occurring due to a reinforcement of refractive power of the second lens group L2 when zooming may be reduced through the cemented lens 125.

The third lens group L3 includes one lens 131. The fourth lens group L4 includes three lenses 141, 142, and 143. The fifth lens group L5 includes one lens 151. The sixth lens group L6 includes one lens 161.

TABLE 5

| Lens Surface | R | Dn | Nd | Vd | Remarks |
|---|---|---|---|---|---|
| S1 | 793.782 | 1.00 | 1.8340 | 37.34 | |
| S2 | 72.624 | 4.64 | 1.4969 | 81.60 | |
| S3 | −264.817 | 0.15 | | | |
| S4 | 78.201 | 3.42 | 1.4969 | 81.60 | |
| S5 | 3290.457 | 0.15 | | | |
| S6 | 56.9111 | 3.65 | 1.5928 | 68.62 | |
| S7 | 198.782 | D1 | | | |
| S8 | 173.833 | 0.6 | 1.8042 | 46.50 | |
| S9 | 9.337 | 4.77 | | | |
| S10 | −35.289 | 0.6 | 1.7291 | 54.67 | |
| S11 | 40.738 | 1.0 | | | |
| S12 | 19.285 | 2.57 | 2.0027 | 19.31 | |
| S13 | ∞ | 0.6 | | | |
| S14 | 34.726 | D2 | | | |
| S15 | 69.545 | 0.75 | 1.5311 | 55.73 | Aspherical Surface |
| S16 | 251.344 | 0.7 | | | |
| S17 | Iris (IRIS) | D3 | | | |
| S18 | 10.383 | 2.64 | 1.5533 | 71.68 | Aspherical Surface |
| S19 | −96.272 | 3.18 | | | Aspherical Surface |
| S20 | 62.726 | 1.00 | 1.9108 | 35.25 | |

TABLE 5-continued

| Lens Surface | R | Dn | Nd | Vd | Remarks |
|---|---|---|---|---|---|
| S21 | 10.553 | 0.23 | | | |
| S22 | 14.173 | 2.47 | 1.4969 | 81.60 | |
| S23 | −14.845 | D4 | | | |
| S24 | −58.165 | 0.5 | 1.4874 | 70.44 | |
| S25 | 23.847 | D5 | | | |
| S26 | 17.224 | 1.78 | 1.4971 | 81.55 | Aspherical Surface |
| S27 | 91.638 | D6 | | | |
| S28 | ∞ | 0.6 | 1.5167 | 64.19 | |
| S29 | ∞ | 0.3 | | | |

Table 6 below shows a variable distance of the zoom lens 100 according to the present exemplary embodiment.

TABLE 6

| | Space 1 | Space 2 | Space 3 | Space 4 | Space 5 | Space 6 |
|---|---|---|---|---|---|---|
| Wide angle position (84.4 deg) | 0.5 | 41.55 | 17.42 | 3.13 | 6.43 | 6.90 |
| Middle position (40.2 deg) | 17.15 | 17.00 | 11.40 | 3.00 | 5.48 | 14.02 |
| Telephoto position (2.7 deg) | 61.87 | 1.20 | 0.10 | 8.14 | 19.61 | 6.05 |

Table 7 below shows aspherical coefficients of the zoom lens 100.

TABLE 7

S16 Aspherical Coefficient
K: 0
A: −.411466E−08   B: −.977799E−08   C: 0,   D: 0
S20 Aspherical Coefficient
K: 0
A: −.384322E−04   B: 0.306855E−05   C: −.145689E−06   D: 0.384351E−08
S21 Aspherical Coefficient
K = 0
A: 0.108235E−03   B: 0.352105E−05   C: −.163975E−06   D: 0.453609E−08
S29 Aspherical Coefficient
K = 0
A: −.111833E−04   B: 0.553837E−06   C: −.179260E−07   D: 0.353205E−09

Table 8 below shows that the zoom lens 100 satisfies Equations 1 through 11.

TABLE 8

| Equation | | Present Exemplary Embodiment |
|---|---|---|
| Equation 1 | $0.5 < |f2|/fw < 2.4$ | 2.3104 |
| Equation 2 | $-4.5 < M5/fw < -3.0$ | −3.63626 |
| Equation 3 | $0.01 < (D45t - D45w)/fw < 1.0$ | 1.13556 |
| Equation 4 | $4.0 < f1/fw < 19.0 \ldots (4)$ | 18.706 |
| Equation 5 | $30 < f3/fw < 42$ | 40.8126 |
| Equation 6 | $1.0 < f4/fw < 4.3$ | 4.13815 |
| Equation 7 | $2.0 < |f5|/fw < 10.1$ | −7.82419 |
| Equation 8 | $3.0 < f6/fw < 9.7$ | 9.57045 |
| Equation 9 | $-0.7 < (R5a + R5b)/(R5a - R5b) < 0.5$ | 0.418455 |
| Equation 10 | $65 < v5$ | 70.44 |
| Equation 11 | $1.5 < (D56t - D56w)/fw < 4.3$ | 2.98903 |

Figure 9:
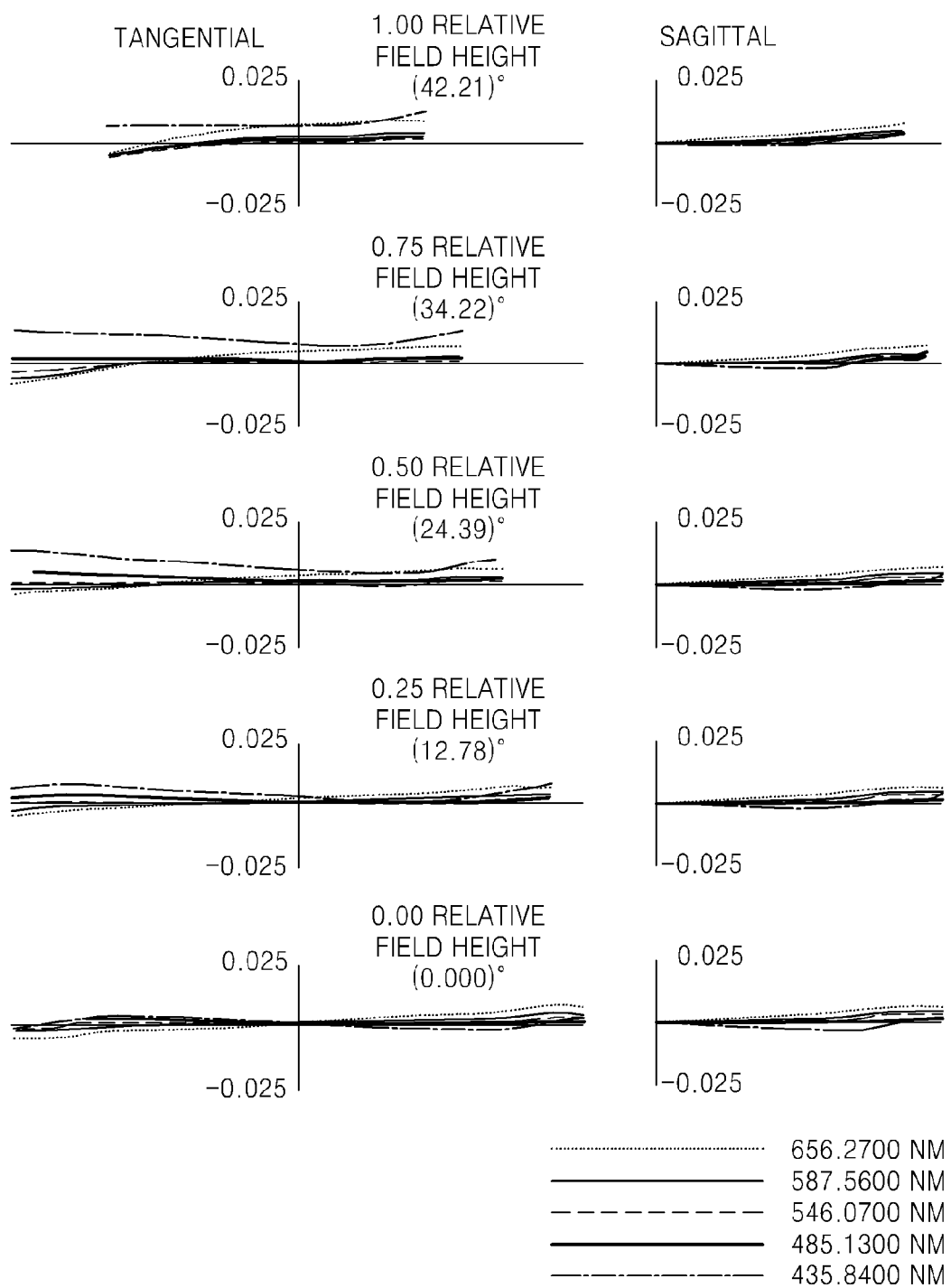
FIG. 9 is a diagram illustrating a lateral aberration of a zoom lens in a wide angle position, according to another exemplary embodiment.
Figure 10:
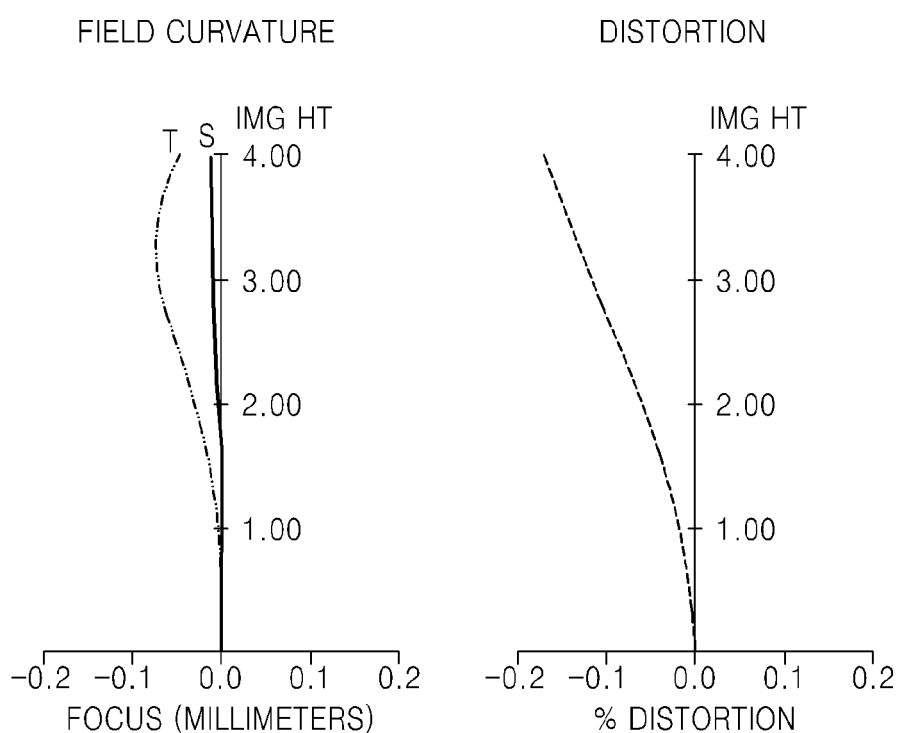
FIG. 10 is a diagram illustrating a field curvature and a distortion of a zoom lens in a wide angle position, according to another exemplary embodiment.
Figure 11:
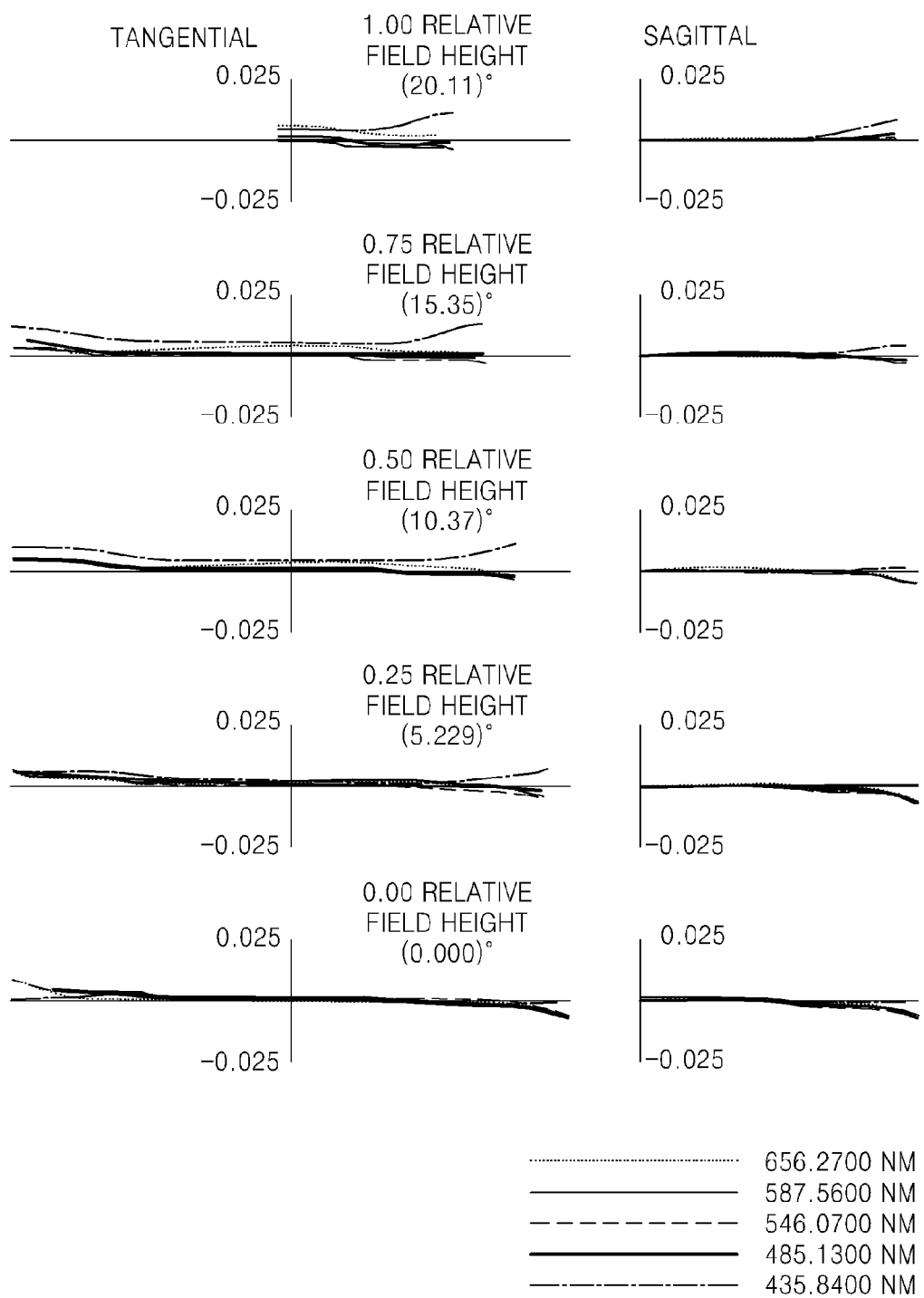
FIG. 11 is a diagram illustrating a lateral aberration of a zoom lens in a middle position, according to another exemplary embodiment.
Figure 12:
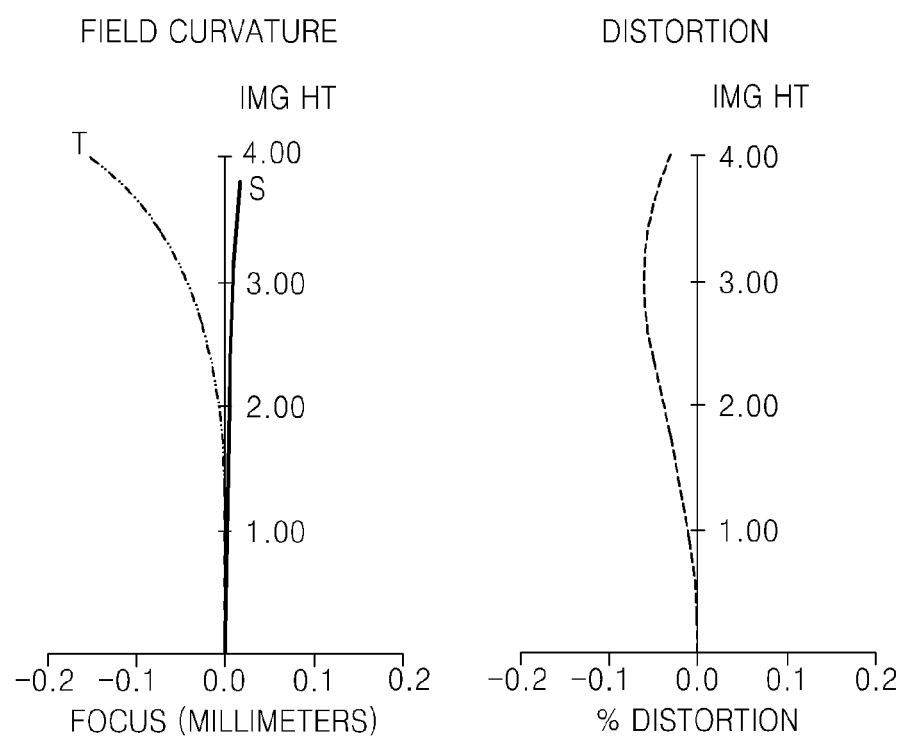
FIG. 12 is a diagram illustrating a field curvature and a distortion of a zoom lens in a middle position, according to another exemplary embodiment.
Figure 13:
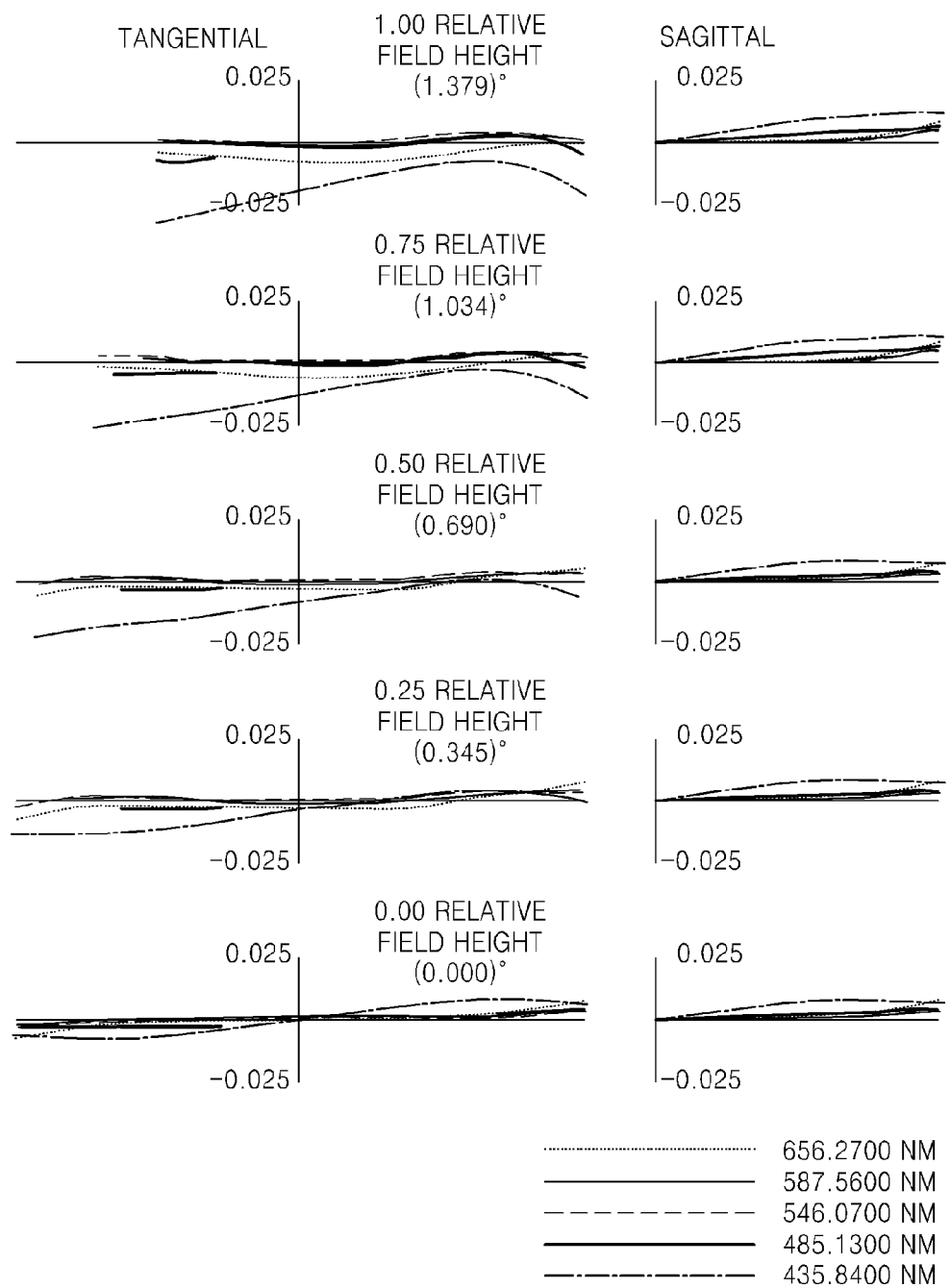
FIG. 13 is a diagram illustrating a lateral aberration of a zoom lens in a telephoto position, according to another exemplary embodiment.
Figure 14:
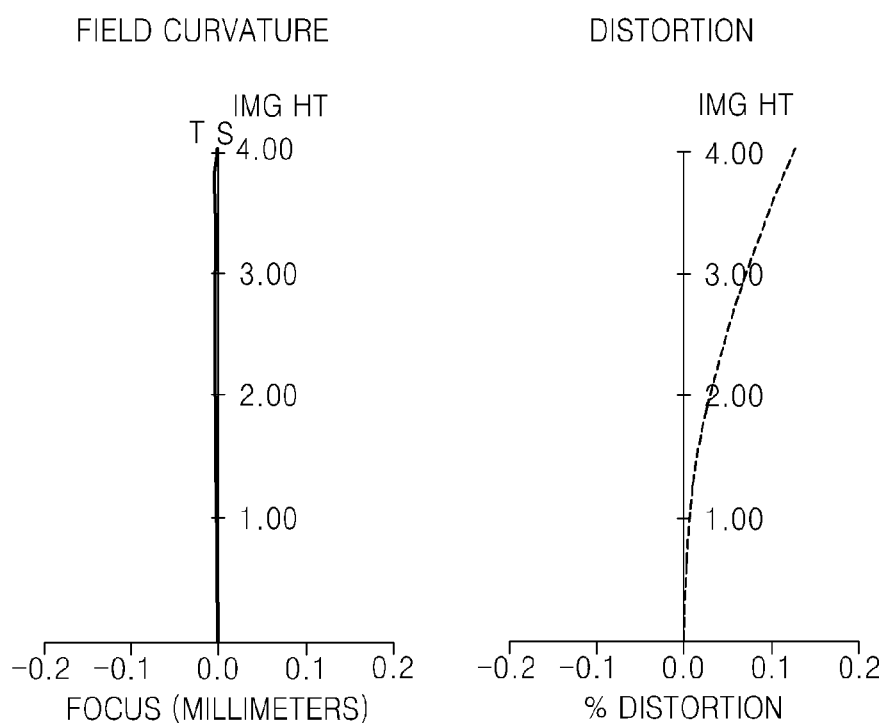
FIG. 14 is a diagram illustrating a field curvature and a distortion of a zoom lens in a telephoto position, according to another exemplary embodiment.

FIGS. 9, 11, and 13 respectively illustrate lateral aberrations of the zoom lens 100 in the wide angle position, the middle position, and the telephoto position, i.e., illustrate a meridional fan and a sagittal fan in fields 0.0 (on axis), 0.3, 0.6, 0.8, and 1.0. FIGS. 10, 12, and 14 respectively illustrate field curvatures and distortions of the zoom lens 100 in the wide angle position, the middle position, and the telephoto position.

A zoom lens according to an exemplary embodiment may fix lens groups including a shutter when zooming so that a driver for driving the lens groups may be small. Thus, the zoom lens optical system may be small and obtain a high zoom magnification.

Figure 15:
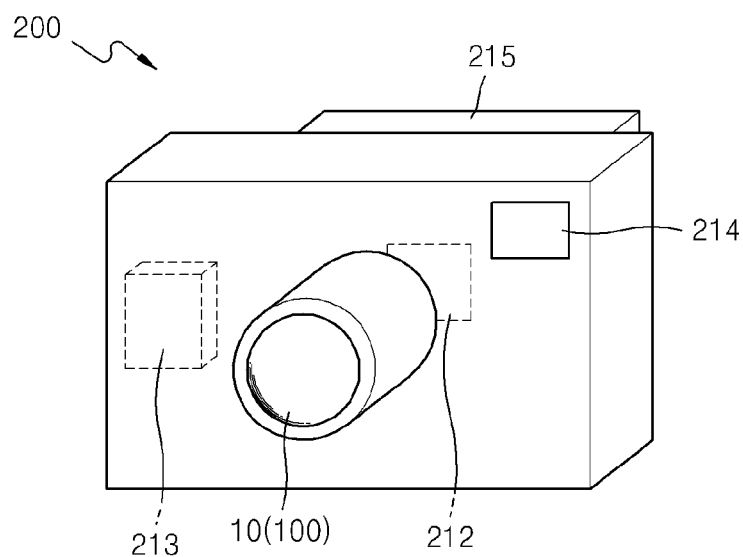
FIG. 15 is a diagram illustrating a photographing apparatus, according to an exemplary embodiment.

FIG. 15 illustrates a photographing apparatus 200 including a zoom lens according to an exemplary embodiment. The photographing apparatus 200 may include the lens 10 or 100 described in the previous embodiments. The photographing apparatus 200 includes an imaging device 212 which receives light focused by the zoom lens 10 or 100. The photographing apparatus 200 includes a recording unit 213 which records information corresponding to an image of a subject photoelectrically transformed from the imaging device 212, and a view finder 214 which observes the image of the subject. The photographing apparatus 200 includes a display 215 which displays the image of the subject. Here, the view finder 214 and the display 215 are separately installed, but the display 215 may be installed without the view finder 214. The photographing apparatus 200 of FIG. 15 is only an exemplary embodiment and thus may be applied to various types of optical apparatuses besides a camera. As described above, a zoom lens may be applied to a photographing apparatus such as a digital camera or the like to create an optical apparatus which may have a small size and perform photographing at a high resolution and a high magnification.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A zoom lens comprising:
a first lens group which has a positive refractive power;
a second lens group which has a negative refractive power;
a third lens group which comprises a shutter and has a positive refractive power;
a fourth lens group which has a positive refractive power;
a fifth lens group which has a negative refractive power; and
a sixth lens group which has a positive refractive power,
wherein the first, second, third, fourth, fifth, and sixth lens groups are arranged from an object side toward an image side, and when the zoom lens zooms from a wide angle position to a telephoto position, the third lens group is fixed, and the first, second, fourth, fifth, and sixth lens groups are moved, and
wherein the first lens group comprises a first positive lens, a second positive lens, and a third positive lens having a meniscus shape whose object side surface is convex.

2. The zoom lens of claim 1, wherein when the zoom lens zooms from the wide angle position to the telephoto position, a space between the first and second lens groups is increased, a space between the second and third lens groups is decreased, a space between the third and fourth lens groups is decreased, a space between the fourth and fifth lens groups is increased, and a space between the fifth and sixth lens groups is varied.

3. The zoom lens of claim 1, wherein the zoom lens satisfies Equation below:

$$0.5 < |f2|/fw < 2.4$$

wherein f2 denotes a focal length of the second lens group, fw denotes a focal length of the zoom lens at the wide angle position.

4. The zoom lens of claim 1, wherein the zoom lens satisfies Equations below:

$$-4.5 < M5/fw < -3.0$$

$$0.01 < (D45t - D45w)/fw < 1.2$$

wherein M5 denotes a movement amount of the fifth lens group when the zoom lens zooms from the wide angle position to the telephoto position, D45w denotes a space between the fourth and fifth lens groups in the wide angle position, D45t denotes a space between the fourth and fifth lens groups in the telephoto position, and fw denotes a focal length of the zoom lens at the wide angle position.

5. The zoom lens of claim 1, wherein the zoom lens satisfies Equation below:

$$4.0 < f1/fw < 19.0$$

wherein f1 denotes a focal length of the first lens group, and fw denotes the focal length of the zoom lens at the wide angle position.

6. The zoom lens of claim 1, wherein the zoom lens satisfies Equation below:

$$1.0 < f4/fw < 4.3$$

wherein f4 denotes a focal length of the fourth lens group, and fw denotes the focal length of the zoom lens at the wide angle position.

7. The zoom lens of claim 1, wherein the zoom lens satisfies Equation below:

$$2.0 < |f5|/fw < 10.1$$

wherein f5 denotes a focal length of the fifth lens group, and fw denotes the focal length of the zoom lens at the wide angle position.

8. The zoom lens of claim 1, wherein the zoom lens satisfies Equation below:

$$3.0 < f6/fw < 9.7$$

wherein f6 denotes a focal length of the sixth lens group, and fw denotes the focal length of the zoom lens at the wide angle position.

9. The zoom lens of claim 1, wherein the fifth lens group comprises one negative lens.

10. The zoom lens of claim 9, wherein the zoom lens satisfies Equation below:

$$-0.7 < (R5a + R5b)/(R5a - R5b) < 0.5$$

wherein R5a and R5b respectively denote a radius of curvature of an object side surface of the negative lens of the fifth lens group and a curvature radius of an image side surface of the negative lens of the fifth lens group.

11. The zoom lens of claim 9, wherein the zoom lens satisfies Equation below:

$$65 < v5$$

wherein v5 denotes an Abbe's number of the negative lens of the fifth lens group.

12. The zoom lens of claim 1, wherein the first and second positive lenses are cemented together.

13. The zoom lens of claim 1, wherein the first lens group further comprises a fourth positive lens having a meniscus shape whose object side surface is convex.

14. The zoom lens of claim 1, wherein the fourth lens group compensates for hand-shaking.

15. The zoom lens of claim 1, wherein the sixth lens group performs focusing.

16. A zoom lens comprising:
a first lens group which has a positive refractive power;
a second lens group which has a negative refractive power;
a third lens group which comprises a shutter and has a positive refractive power;
a fourth lens group which has a positive refractive power;
a fifth lens group which has a negative refractive power; and
a sixth lens group which has a positive refractive power,
wherein the first, second, third, fourth, fifth, and sixth lens groups are arranged from an object side toward an image side, and when the zoom lens zooms from a wide angle position to a telephoto position, the third lens group is fixed, and the first, second, fourth, fifth, and sixth lens groups are moved, wherein the zoom lens satisfies Equation below:

$$30 < f3/fw < 42$$

wherein f3 denotes a focal length of the third lens group, and fw denotes the focal length of the zoom lens at the wide angle position.

17. A zoom lens comprising:
a first lens group which has a positive refractive power;
a second lens group which has a negative refractive power;
a third lens group which comprises a shutter and has a positive refractive power;
a fourth lens group which has a positive refractive power;
a fifth lens group which has a negative refractive power; and
a sixth lens group which has a positive refractive power,
wherein the first, second, third, fourth, fifth, and sixth lens groups are arranged from an object side toward an image side, and when the zoom lens zooms from a wide angle position to a telephoto position, the third lens group is fixed, and the first, second, fourth, fifth, and sixth lens groups are moved, wherein the zoom lens satisfies Equation below:

$$1.5 < (D56t - D56w)/fw < 4.3$$

wherein D56w and D56t respectively denote a space between the fifth and sixth lens groups in the wide angle position and a space between the fifth and sixth lens groups in the telephoto position, and fw denotes the focal length of the zoom lens at the wide angle position.

18. A zoom lens comprising:
a first lens group which has a positive refractive power;
a second lens group which has a negative refractive power;
a third lens group which comprises a shutter and has a positive refractive power;
a fourth lens group which has a positive refractive power;
a fifth lens group which has a negative refractive power; and
a sixth lens group which has a positive refractive power,
wherein the first, second, third, fourth, fifth, and sixth lens groups are arranged from an object side toward an image side, and when the zoom lens zooms from a wide angle position to a telephoto position, the third lens group is fixed, and the first, second, fourth, fifth, and sixth lens groups are moved, wherein the second lens group comprises a negative lens whose object side surface is convex and whose image side surface is concave, a negative lens whose surfaces on both sides are concave, and a positive lens whose object side surface is convex and whose image side surface is concave.

19. The zoom lens of claim 18, wherein the second lens group further comprises a negative lens whose object side surface is convex and whose image side surface is concave.

20. A photographing apparatus comprising:
a zoom lens; and
an imaging device,
wherein the zoom lens comprises:
a first lens group having a positive refractive power,
a second lens group having a negative refractive power,
a third lens group comprising a shutter and having a positive refractive power,
a fourth lens group having a positive refractive power,
a fifth lens group having a negative refractive power, and
a sixth lens group having a positive refractive power,
wherein the first, second, third, fourth, fifth, and sixth lens groups are arranged from an object side toward the image side, and when the zoom lens zooms from a wide angle position to a telephoto position, the third lens group is fixed, and the first, second, fourth, fifth, and sixth lens groups are moved, and
wherein the first lens group comprises a first positive lens, a second positive lens, and a third positive lens having a meniscus shape whose object side surface is convex.

* * * * *